United States Patent [19]

Agnew

[11] 3,855,501
[45] Dec. 17, 1974

[54] MULTIPLE VEHICLE SPARK ELIMINATION SYSTEM FOR EXPLOSIVE ATMOSPHERES

[75] Inventor: Thomas I. Agnew, Irwin, Pa.

[73] Assignee: Gulton Industries, Inc., Metuchen, N.J.

[22] Filed: Mar. 15, 1974

[21] Appl. No.: 451,518

[52] U.S. Cl. .............................. 317/18 C, 317/45
[51] Int. Cl. ............................................. H02h 3/16
[58] Field of Search......... 317/18 C, 18 A, 18 R, 44, 317/45, 20; 307/35

[56] References Cited
UNITED STATES PATENTS
3,676,739   7/1972   Neuhouser ..................... 317/18 C
3,728,582   4/1973   Agnew ........................... 317/18 C Primary Examiner—James D. Trammell
Attorney, Agent, or Firm—Wallenstein, Spangenberg, Hattes & Strampel

[57] ABSTRACT

In a system which delivers electrical power from a main source of power through separate cables to at least two separately movable vehicles in an explosive atmosphere, there is provided arc-preventing means for preventing the development of an arc in said explosive atmosphere when the frames of two vehicles come into contact with one another and then separate due to an unbalanced voltage or voltages induced in the vehicle frame connected grounding conductors of one or more of the cables. The arc preventing means comprise saturable core reactor means in series with the cable grounding conductors, the saturable core reactor means being unsaturated to present a high impedance to current flow under the modest voltage conditions caused by unbalanced induced voltages in the grounding conductors and being saturated to present a negligible impedance to current flow under the voltage conditions when any cable power conductor becomes shorted to the associated cable grounding conductor or vehicle frame.

4 Claims, 3 Drawing Figures 3,855,501

MULTIPLE VEHICLE SPARK ELIMINATION SYSTEM FOR EXPLOSIVE ATMOSPHERES

BACKGROUND OF THE INVENTION

The invention relates to a machine grounding system, and has one of its most important applications in a system of grounding power cables extending to two or more vehicles carrying mining equipment in an explosive atmosphere.

Mining equipment which removes minerals from the face of an underground mine is very commonly driven by DC or AC electric motors which are supplied with electric power through power conductors in cables trailing behind the vehicles. The cables extend to a remote point which may be 500 to 5,000 feet or more from the mining vehicles where they terminate on another vehicle, referred to as a power sled, which carries transformers circuit control and switching equipment. There is a danger that the cables can be damaged, causing short circuits in the conductors of the cables, or a short circuit can otherwise occur, which undesirably places a dangerous voltage on the frames of the mining vehicles which is generally connected to some unenergized part of the cable like the cable sheath.

To eliminate this shock hazard, mine safety rules generally require that each cable include a grounding conductor (which may be supplied by the sheath of the cable or by a separate conductor in the cable) connected to the frame of the mining vehicle involved. The grounding conductor is connected to earth ground at the power sled, and a control relay and a current limiting resistance are connected between earth ground and an isolated common power conductor reference point. Where, as is customary, electric power for the DC or AC power source to the motors of the mining equipment is obtained from a three phase high voltage input cable, a Y-connected grounding transformer on the power sled is used to supply the isolated common power conductor reference point at the junction of three Y-connected transformer secondary windings. An undesired short circuiting of the frame of the mining equipment to one of the power conductors will then result in the flow of current through the control relay which effects the opening of interrupter contacts which disconnect power to the cable power conductors.

Where there are two or more mining equipment vehicles with separate trailing cables, the presence of the vehicle frame connected grounding conductors in the two cables as just described can create an arcing hazard in the explosive atmosphere involved should the frames of two mining equipment vehicles involved come into contact and then separate. The arcing hazard is caused by small differences in unbalanced voltages induced in the grounding conductors of the two cables respectively connected to the mining equipment vehicle frames under load conditions. Small but dangerous voltages can be induced into the grounding conductor of a cable carrying alternating current where, as is not uncommon, the grounding conductor therein is not symmetrically located with respect to three power conductors of a three phase cable. (If the grounding conductor is symmetrically positioned in the cable, the voltages induced therein by the current flowing in the power conductors will generally cancel out.) Since the grounding conductors of the cables of the two mining equipment vehicles referred to are connected to the same earth ground point, the generation of unbalanced voltages therein can cause a resultant voltage between the vehicle frames to which they are connected of as much as 6 volts. Because of the low resistance circuit involved, such a modest but significant voltage can cause arc-creating current flow should the vehicle frames to which the two grounding conductors are connected come into contact. The arcing occurs when two such contacting vehicles separate. It is, of course, imperative to prevent arcing particularly at the location of the mine face where the atmospheres can be especially explosive.

To alleviate a sparking hazard under the conditions just described, it has been proposed by the U.S. Bureau of Mines to incorporate in connections between the cable grounding conductors and earth ground an energy absorbing circuit comprising a full wave diode bridge unit comprising at least five diodes, which present a high impedance path for AC applied voltages of about 7 volts or less, and which present a low impedance path for higher voltages which are present when a power conductor becomes short circuited to the frame of the associated mining equipment vehicle, where sufficient current flow must occur to operate the aforementioned control relay which disconnects the interrupter contacts above referred to.

SUMMARY OF THE INVENTION

The present invention represents an improvement over the monitoring system including the diode bridge units placed in the connections between the cable grounding conductors and earth ground in that it provides a much more reliable and less costly means for achieving the same result. Thus, in accordance with the present invention, the aforesaid diode bridge units are each replaced by a saturable core reactor, most advantageously a square loop swinging choke saturable reactor, which offers a very high impedance to low induced voltages like 7 volts and under, and a very low impedance to higher voltages. A square loop swinging choke saturable reactor can be made for only a fraction of the cost of a five diode bridge circuit, and while saturable core reactors have been used for diverse purposes before, they have not previously been proposed for use in the connections of cable grounding conductors and earth ground as above described. A saturable core reactor used as above described has the additional advantage that it operates in the same manner independently of the direction of the applied voltage thereto, unlike diodes which are unidirectional devices. The need for five diodes in the bridge unit described is partially a result of this unidirectional current flow characteristic.

DESCRIPTION OF THE PREFERRED EMBODIMENTS OF THE INVENTION

Figure 1:
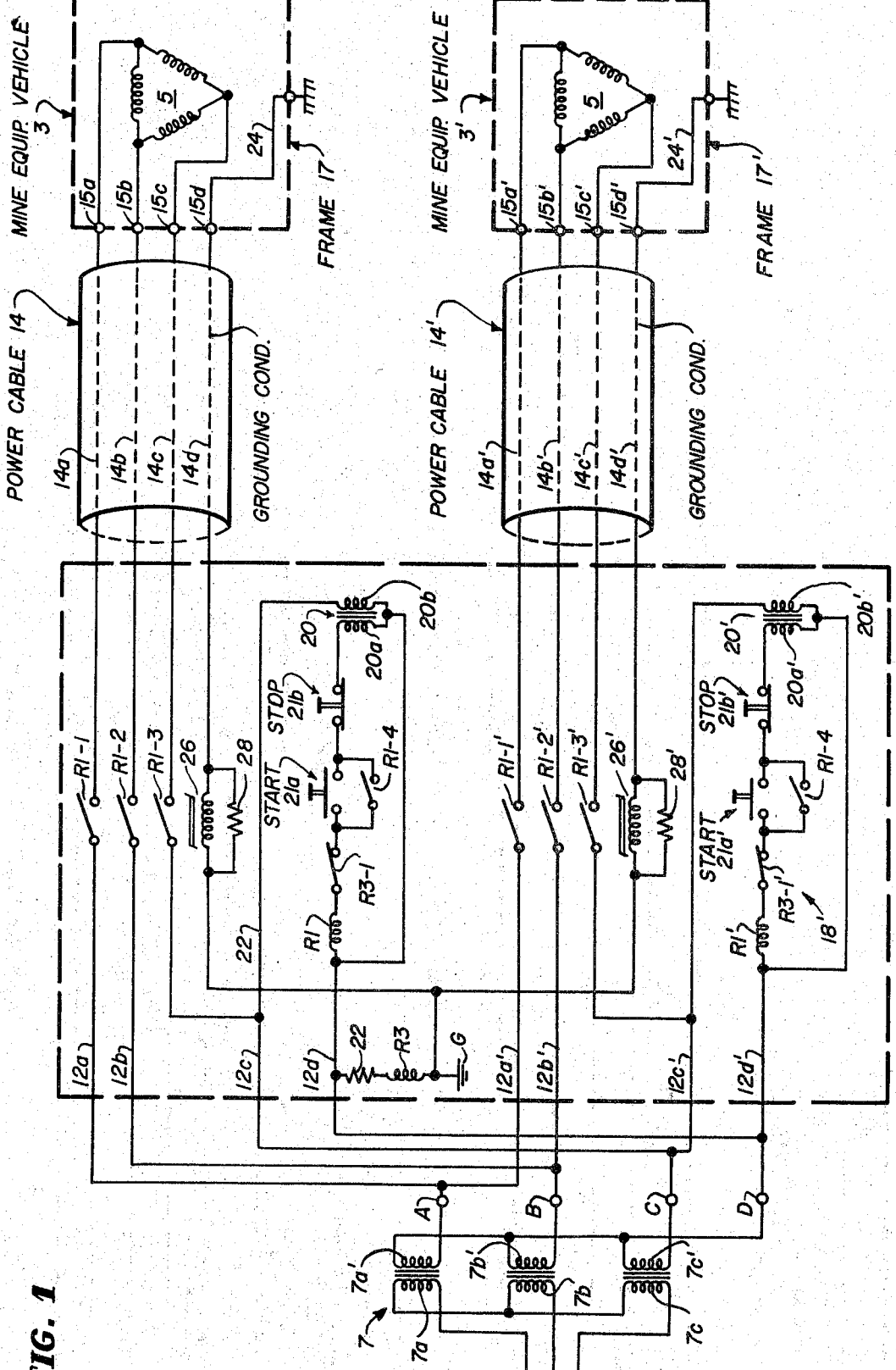
FIG. 1 shows a three phase power system for two mining vehicles which system includes the arc preventing means of the present invention.

Refer now more particularly to FIG. 1 which illustrates the invention applied to a system for supplying power from a source of power controlled by equipment on a power sled 1 to electric motors which drive mining equipment on vehicles 3–3' which can be mounted on tracks or otherwise rendered mobile in the mining areas involved. The delta connected field windings 5–5' of a motor on each of the vehicles 3–3' are illustrated in FIG. 1. The more or less conventional portions of an exemplary three phase power system for operating the mining equipment on the vehicles 3–3' will first be described. (However, it should be understood that the present invention is also applicable to single phase AC to DC cable power systems where there is available a common reference point, such as is available from a Y connected three phase transformer from which single phase power is available between two outputs thereof or DC power is obtainable from a rectifier circuit connected to such outputs.)

High voltage three phase input power conductors 5 make electrical connection on the power sled 1 to a three-phase step down transformer 7 having three Y-connected primary windings 7a, 7b and 7c respectively magnetically coupled to three Y-connected secondary windings 7a', 7b' and 7c'. The secondary windings 7a', 7b' and 7c' have output terminals A, B and C at which a reduced three phase voltage output appears and a common isolated reference terminal D to which one end of all of the transformer Y-connected secondary windings are connected. Conductors 12a–12b–12c and 12a'–12b'–12c' respectively extend from the output terminals A, B and C to interrupter contacts R1–R-2–R3 and R1'–R2'–R3', in turn, connected to the power conductors 14a–14b–14c and 14a'–14b'–14c' of power cables 14 and 14' extending to the mining equipment vehicles 3 and 3'.

The cable power conductors 14a–14b–14c and 14a'–14b'–14c' extend to voltage input terminals 15a–15b–15c and 15a'–15b'–15c' of the aforesaid electric motors on the mining equipment vehicles 3–3'. Each cable 14 or 14' also has a grounding conductor 14d or 14d' connected by a conductor 24 or 24' with a frame 17 or 17' on the associated mining vehicle. The cables 14–14' trail rearwardly from the mining vehicle 3–3' and terminate at the power sled 1 which carries control equipment controlling the flow of power through the cables 14 and 14'.

The control means for operation of the interrupter contacts R1-1, R1-2 and R1-3 controlling the flow of power to the mining equipment vehicle 3 through the cable 14 will now be described, it being understood that the control means for the other mining equipment vehicle 3' is identical thereto. Corresponding components of the control means are similarly numbered in FIG. 1, except that a prime (') has been added to the reference numbers identifying the components associated with the control equipment and circuitry for the mining equipment vehicle 3'.

The interrupter contacts R1-1, R1-2 and R1-3 can be controlled in any suitable way, such as by a relay R1 operated by a control circuit 18. When the control coil of relay R1 is energized, the interrupter contacts are closed. One end of the contol coil of relay R1 is shown connected to common conductor 19 extending to the isolated common reference point terminal D of the transformer 7, which connects with the juncture point of the Y-connected secondary windings of the transformer. The other end of the control coil of relay R1 is shown connected in series with normally closed contacts R3-1 controlled by a relay R3 which has corresponding contacts R3-1' in the control circuit 18' which controls the power fed to the mining equipment vehicle 3'. Normally closed contacts R3-1 are connected to one end of the primary winding 20a of a transformer 20 through normally open start push button contacts 21a and normally closed stop push button contacts 21b whose push buttons are accessible to an operator on the power sled. The start push button contacts 21a are shunted by a set of normally open holding contacts R1-4 which close upon energization of the control coil of relay R1. The other end of the primary winding 20a and one end of the secondary winding 20b of the transformer 20 are connected to the aforementioned common conductor 19. The other end of the secondary winding 20b is connected by a conductor 22 to one of the output terminals C of the transformer 7. The transformer 20 is a step down transformer which provides a relatively low AC voltage for the control circuit 18. It is apparent that upon closure of the start push button contacts 21a, the coil of relay R1 will become energized and locked-in upon closure of the holding contacts R1-4. This will result in the closure of the interrupter contacts R1-1, R1-2 and R1-3. Opening of the stop push button contacts 21b will break the holding circuit for the control coil of relay R1, to de-energize the same and open the interrupter contacts R1-1, R1-2 and R1-3.

Figure 2:
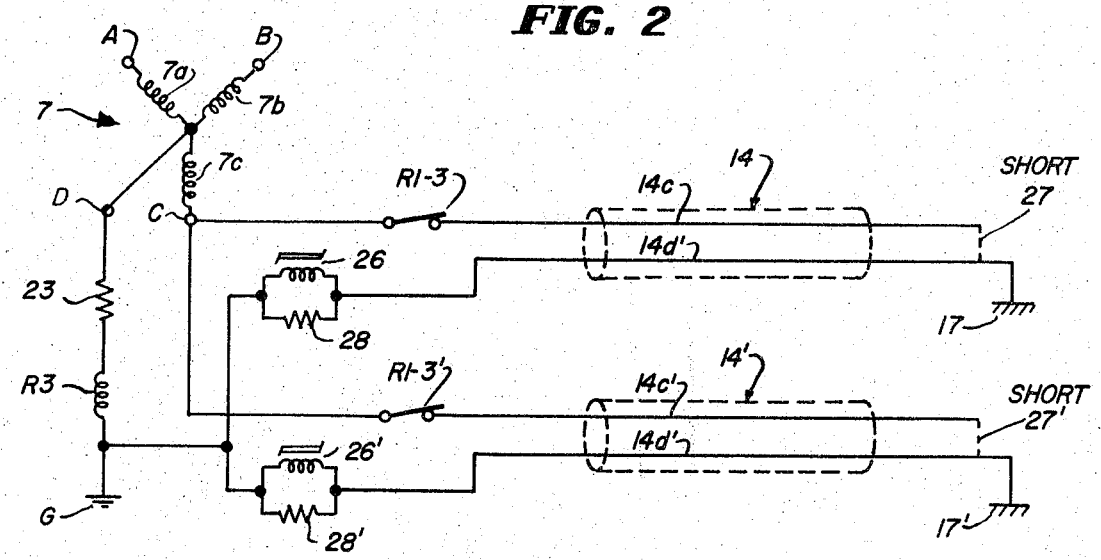
FIG. 2 is a simplified circuit diagram showing that part of the power system of FIG. 1 which protects the operator of the mining vehicles against short circuit and arcing hazards under the conditions where the cable power conductors are short circuited to the mining equipment vehicle frames and where the vehicle frames come into contact.

Relay R3 forms part of a circuit best shown in FIG. 2 which disconnects power from the inlet side of the cables 14 and 14' upon the undesired short circuiting of the frame 17 or 17' of the mining equipment vehicles 3 or 3' to a cable power conductor. To this end, one end of the coil of relay R3 is preferably connected to earth ground G and the other end thereof is connected to a current-limiting resistor 23 tied to the aforementioned common isolated reference terminal D of the transformer 7 connected to the juncture point of the Y-connected secondary windings of the transformer 7.

While a current sensing means like the relay R3 could be placed in the connection between earth ground G and the cable grounding conductors 14d–14d', it is most preferred to eliminate any reactive impedances in the line between the mining vehicle frame 17 and 17' and earth ground G to further minimize any voltage hazards. In other words, the presence of reactive impedances in the line between earth ground and the saturable core reactor means 26 and 26' could increase the voltage hazard on an operator who may be touching the mining vehicle frame 17 or 17' while being connected to earth ground. While the operation of the relay R3 should in any event give some substantial degree of protection against high voltage hazards under the short circuit condition referred to, this hazard is further diminished by the connections of the relay coil as shown in FIGS. 1 and 2. Also, while separate relays like R3 could be associated with the cables 14 and 14', using a common relay to open the power circuits to both cables 14 and 14' should a short circuit occur in only one cable increases the safety of the grounding system.

The circuit for operating the relay R3 includes an arc-preventing saturable core reactor 26 connected between earth ground G and the grounding conductor 14d of the cable 14, or through an arc-preventing saturable core reactor 26' connected between earth ground G and the grounding conductor 14d' of the cable 14'. If a short circuit 27 or 27' (FIG. 2) occurs between any of the power conductors of the cables 14 or 14' and the grounding conductor 14d or 14d', a circuit for current flow through the relay R3 is established through the transformer secondary winding involved by virtue of the connection of relay R3 and resistor 23 to the common isolated reference terminal D connected to the juncture point of the secondary windings of the transformer 7. As soon as the relay R3 becomes energized, contacts R3-1 will open in the control circuit 18, and the contacts R3-1' will open in the control circuit 18', to de-energize the interrupter contact control relays R1 and R1' and open the various interrupter contacts extending to the cable power conductors of both the cables 14 and 14'.

As previously indicated, when substantial current flows through the power conductors of the cables 14 and 14', appreciable electric and magnetic fields are built up within the cable, and, if the grounding conductors 14d and 14d' therein are not symmetrically located therein, unbalanced voltages are induced in the grounding conductors 14d and 14d'. Either one of the cables 14–14' could be a DC power cable in which event there would be a rectifier circuit connected between the output of the transformer 7 and the input to the DC power conductors of the cable involved. In such an AC-DC cable environment or in the environment where the cables 14–14' are both single or three phase AC power cables, if there is a resultant induced voltage in the grounding conductors 14d and 14d' of the power cables 14 and 14', such voltage can be of a value such that if the vehicle frame 17 and 17' should come in contact in the absence of the saturable core reactors 26 and 26' the current flow resulting from the low resistance paths formed by the earth ground connected grounding conductors can cause arcing between the vehicle frames upon their separation. The voltage measured between the grounding conductors 14d and 14d' of conventional AC or DC power cables used to energize mining equipment vehicles even under the worst expected conditions does not exceed 6 or 7 volts, and is more commonly of the order of magnitude of 2 volts or less.

Figure 3:
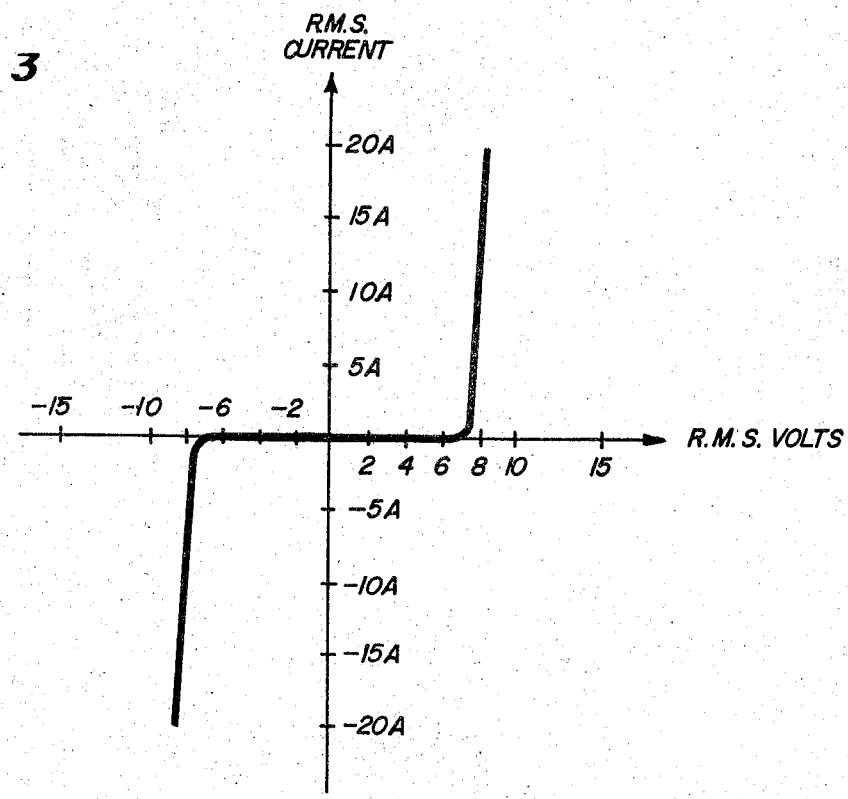
FIG. 3 shows the voltage-current curves of the saturable core reactors forming part of the arc preventing means in FIGS. 1 and 2.

The electrical characteristic of saturable core reactors 26 and 26' is most desirably that shown in FIG. 3, which shows each saturable core reactor to have a square hystresis characteristic. For an applied voltage of up to about 7 volts, practically no AC current flows therein and for an applied voltage in excess of 7 volts, the core thereof becomes saturated quickly, so that the saturable core reacts or acts like an extremely low impedance to the flow of AC current therethrough. It should be apparent, therefore, that typical energizing voltages for electric motors which would drive the mining equipment involved would be far in excess of 7 volts. Thus, the saturable core reactors 26 and 26' will readily pass current necessary to operate the relay R3 should a short circuit occur between any cable power conductor and the grounding conductor 14 or 14d' or frame 17 or 17' of any mining equipment vehicle and will act as an extremely high impedance to the flow of current for an applied voltage induced in the cable grounding conductors by load current flow through the cable power conductors.

As shown in FIGS. 1 and 2, it is preferred to place resistors 28 and 28' in parallel respectively with the saturable core reactors 26 and 26' to dampen any inductive "kick" of the coil so as to reduce the level of the transient voltage generated in the saturable core reactors. The resistors 28 and 28' may be a 10 watt 35 ohm resistor which reduces the effective series inductance of the saturable core reactors from about 100 millihenries in the unshunted state to about 10 millihenries in an exemplary saturable core reactor found most suitable for mining vehicle applications. The exemplary saturable core reactor was a toroidal core of square loop hysteresis material made of lamina of 0.012 inch thick Magnesil material of Magnetics Inc. formed into a 4 inch diameter toroid 1 inch high and one half inch wide. The core had 54 turns of No. 8 AWG copper wire wound thereon, giving a core saturation voltage of approximately 7 volts at 60 Hertz.

It should be understood that numerous modifications may be made to the most preferred form of the invention described without deviating from the broader aspects thereof.

I claim:

1. In a power system which delivers electrical power from a main source of power to at least two separately movable vehicles in an explosive atmosphere, each vehicle including a conductive frame and electrically operated equipment, the electrically operated equipment on each vehicle having at least one pair of energizing input terminals, a separate power cable for each vehicle extending between said vehicle and said main source of power, each cable having at least one pair of power conductors coupled to said energizing input terminals of the electrically operated equipment on the associated vehicle and a grounding conductor connected to the frame of the associated vehicle, the electrical field developed by the flow of current through said power conductors in each of said cables inducing an unbalanced voltage in the associated grounding conductor so there is the possibility of an induced voltage difference in the grounding conductors of a pair of said cables which can reach a given maximum value, interrupter contact means connected between said main source of power and at least one of said power cable conductors, and vehicle frame hazard protection means for operating said interrupter contact means to terminate the flow of power from said main source of power to the electrical equipment of the associated vehicle when at least one of said power conductors of each cable becomes electrically shorted to the associated grounding conductor or vehicle frame, the improvement comprising arc-preventing means for preventing the development of an arc in said explosive atmosphere when the frames of two of said vehicles come into contact with one another due to an unbalanced voltage or voltages induced in the grounding conductor of one or more of said cables, said arc-preventing means comprising saturable core reactor means in series with said grounding conductors which saturable core reactor means being unsaturated to present a high impedance to current flow under modest applied voltage conditions reaching said given magnitude and being saturated to present a negligible impedance to current flow under the voltage conditions when any of said cable power conductors becomes shorted to the associated cable grounding conductor or vehicle frame.

2. The power system of claim 1 wherein the saturable core reactor means is a separate reactor in series with the grounding conductor of each of said cables.

3. The power system of claim 1 in which said main source of power includes a common three phase transformer having a Y-connected series of windings providing at the common juncture of said windings an isolated common reference point, the power conductors of said cables deriving the power from said three phase transformer, at least one of said cables containing three power conductors extending respectively from the unconnected ends of said Y-connected transformer windings, and said vehicle frame hazard protection means including current sensing means for opening the interrupter contact means connected in series between said saturable core reactor means and said isolated common reference point.

4. The power system of claim 3 wherein said sensing means is connected between earth ground and said isolated common reference point, and said saturable core reactor means is connected between earth ground and the grounding conductors of said cables.

* * * * *